(12) United States Patent
McCauley et al.

(10) Patent No.: US 11,842,341 B2
(45) Date of Patent: *Dec. 12, 2023

(54) RISK MITIGATION FOR A CRYPTOASSET CUSTODIAL SYSTEM USING A HARDWARE SECURITY KEY

(71) Applicant: Anchor Labs, Inc., San Francisco, CA (US)

(72) Inventors: Nathan P. McCauley, San Francisco, CA (US); Diogo Monica, San Francisco, CA (US); Boaz Avital, San Francisco, CA (US); Riyaz D. Faizullabhoy, Los Altos, CA (US)

(73) Assignee: Anchor Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,023

(22) Filed: Mar. 4, 2022

(65) Prior Publication Data

US 2022/0188817 A1 Jun. 16, 2022

Related U.S. Application Data

(63) Continuation of application No. 17/386,624, filed on Jul. 28, 2021, now Pat. No. 11,301,849, which is a (Continued)

(51) Int. Cl.
*G06Q 20/38* (2012.01)
*G06Q 20/06* (2012.01)
(Continued)

(52) U.S. Cl.
CPC ....... *G06Q 20/3829* (2013.01); *G06Q 20/065* (2013.01); *H04L 9/0877* (2013.01);
(Continued)

(58) Field of Classification Search
CPC ............ G06Q 20/3829; G06Q 20/065; G06Q 20/40–40975; H04L 9/0877;
(Continued)

(56) References Cited

U.S. PATENT DOCUMENTS 6,950,523 B1 9/2005 Brickell
9,892,460 B1 2/2018 Winklevoss
(Continued)

FOREIGN PATENT DOCUMENTS

WO WO 2019/168792 9/2019

OTHER PUBLICATIONS

Dror Trieman, "Can HSM technology make blockchain wallets and transactions safer", Jan. 7, 2019 (Year: 2019).
(Continued)

*Primary Examiner* — Jay Huang
(74) *Attorney, Agent, or Firm* — Bookoff McAndrews, PLLC

(57) ABSTRACT

An approval request is transmitted for a cryptoasset transaction in accordance with a policy stored in a hardware security module ("HSM"). The policy specifies at least one specific approver required for approval of the cryptoasset transaction. The approval request is transmitted to a computer device associated with the specific approver and is configured to cause the computer device to prompt the specific approver to approve the cryptoasset transaction. A security key is received from a hardware security token associated with the specific approver. The security key indicates an approval of the cryptoasset transaction. A risk analysis module authenticates an identity of the specific approver based on the security key. Responsive to the authenticating of the identity of the specific approver, the HSM signs the cryptoasset transaction using a cryptographic key stored in the HSM.

18 Claims, 10 Drawing Sheets

Related U.S. Application Data continuation of application No. 16/580,931, filed on Sep. 24, 2019, now Pat. No. 11,100,497.

(60) Provisional application No. 62/889,393, filed on Aug. 20, 2019.

(51) Int. Cl.
  *H04L 9/40* (2022.01)
  *H04L 9/32* (2006.01)
  *H04L 9/08* (2006.01)

(52) U.S. Cl.
  CPC .......... *H04L 9/0897* (2013.01); *H04L 9/3226* (2013.01); *H04L 9/3228* (2013.01); *H04L 9/3234* (2013.01); *H04L 9/3247* (2013.01); *H04L 9/3271* (2013.01); *H04L 63/20* (2013.01); *H04L 9/0872* (2013.01); *H04L 2209/56* (2013.01)

(58) Field of Classification Search
  CPC ... H04L 9/0897; H04L 9/3226; H04L 9/3228; H04L 9/3234; H04L 9/3247; H04L 9/3271; H04L 63/20; H04L 9/0872; H04L 2209/56
  See application file for complete search history.

(56) References Cited

U.S. PATENT DOCUMENTS

| | | | |
|---|---|---|---|
| 9,916,581 B2 | 3/2018 | Dorsey | |
| 10,068,228 B1 | 9/2018 | Winklevoss | |
| 10,373,158 B1 | 8/2019 | James | |
| 10,439,811 B2 | 10/2019 | Norton | |
| 11,095,446 B2 * | 8/2021 | Monica | H04L 9/0897 |
| 11,100,497 B2 * | 8/2021 | McCauley | H04L 9/3247 |
| 11,301,845 B2 * | 4/2022 | Monica | H04L 9/3247 |
| 11,494,763 B2 * | 11/2022 | Monica | G06F 21/6218 |
| 11,501,291 B2 * | 11/2022 | McCauley | G06Q 20/389 |
| 11,562,349 B2 * | 1/2023 | McCauley | G06Q 20/4016 |
| 2002/0087479 A1 | 7/2002 | Malcolm | |
| 2004/0128504 A1 | 7/2004 | Kivinen | |
| 2004/0236694 A1 | 11/2004 | Tattan | |
| 2005/0273442 A1 * | 12/2005 | Bennett | H04L 63/08 705/67 |
| 2008/0031460 A1 | 2/2008 | Brookner | |
| 2010/0024017 A1 | 1/2010 | Ashfield | |
| 2010/0119061 A1 | 5/2010 | Kawale | |
| 2011/0154025 A1 | 6/2011 | Spalka | |
| 2012/0192260 A1 * | 7/2012 | Kontsevich | G06F 21/42 726/9 |
| 2014/0046842 A1 | 2/2014 | Irudayam | |
| 2014/0156534 A1 | 6/2014 | Quigley | |
| 2015/0170112 A1 | 6/2015 | DeCastro | |
| 2015/0287026 A1 * | 10/2015 | Yang | G06Q 20/065 705/69 |
| 2015/0373122 A1 | 12/2015 | Steel | |
| 2016/0189134 A1 | 6/2016 | Voege | |
| 2016/0283920 A1 | 9/2016 | Fisher | |
| 2016/0285872 A1 | 9/2016 | Polar | |
| 2017/0006018 A1 | 1/2017 | Campagna | |
| 2017/0154331 A1 | 6/2017 | Voorhees | |
| 2017/0230375 A1 | 8/2017 | Kurian | |
| 2017/0373849 A1 | 12/2017 | Donner | |
| 2017/0374033 A1 | 12/2017 | Kovacs | |
| 2018/0130158 A1 | 5/2018 | Atkinson | |
| 2018/0181737 A1 | 6/2018 | Tussy | |
| 2018/0367311 A1 | 12/2018 | Stahlberg | |
| 2018/0367316 A1 | 12/2018 | Cheng | |
| 2019/0043022 A1 | 2/2019 | Fosmark | |
| 2019/0207915 A1 | 7/2019 | Schaap | |
| 2019/0236594 A1 | 8/2019 | Ehrloch-Quinn | |
| 2019/0251524 A1 | 8/2019 | Sadrizadeh | |
| 2019/0266576 A1 | 8/2019 | McCauley | |
| 2019/0268165 A1 | 8/2019 | Monica | |
| 2019/0305956 A1 | 10/2019 | Irani, III | |
| 2019/0347666 A1 | 11/2019 | Bermudez-Cisneros | |
| 2019/0356491 A1 | 11/2019 | Herder, III | |
| 2019/0372779 A1 | 12/2019 | Monica | |
| 2020/0005296 A1 * | 1/2020 | Green | H04L 9/3297 |
| 2020/0074468 A1 * | 3/2020 | Arai | G06Q 20/405 |
| 2020/0151686 A1 * | 5/2020 | Komandur | H04L 9/3239 |
| 2020/0167338 A1 * | 5/2020 | Brock | G06N 5/043 |
| 2020/0233858 A1 | 7/2020 | Deng | |
| 2020/0266997 A1 | 8/2020 | Monica | |
| 2020/0371833 A1 * | 11/2020 | Baset | H04L 63/123 |
| 2020/0380523 A1 | 12/2020 | Agrawal | |

OTHER PUBLICATIONS

David Gorman, Introduction to the endorsement of transactions in a business network, Jul. 28, 2018, IBM (Year: 2018).

Anonymous: "CASP Solution Overview," and "Installing Casp" Mar. 2019, retrieved from the Internet: URL: https://www.unboundtech.com/docs/CASP/Versions/1.0.1902/CASPUserGuideHTML/Content/Products/CASP/CASP Offering_Description/Solution.htm#h2 10.

Sato et al., "General Security Considerations for Cryptoassets Custodians draft-vcgtf-crypto-assets-security-considerations-04," Apr. 2019, retrieved from the Internet: URL:https ://tools.ietf.org/html/draft-vcgtf-crypto-assets-securitv-considerations-04, 47 pages.

PCT International Search Report and Written Opinion in International Appln. No. PCT/US2020/017411, dated Apr. 15, 2020, 19 pages.

PCT International Search Report and Written Opinion in International Appln. No. PCT/US2020/043882, dated Nov. 2, 2020, 12 pages.

PCT International Search Report and Written Opinion in International Appln. No. PCT/US2020/045737, dated Nov. 11, 2020. 12 pages.

PCT International Search Report and Written Opinion in International Appln. No. PCT/US2019/019414, dated Mav 15, 2019, 12 pages.

PCT International Search Report and Written Opinion in International Appln. No. PCT/US2019/019425, dated May 9, 2019, 12 pages.

Bonneau et al._ "SoK: Research Perspectives and Challenges for Bitcoin and Cryptocurrencies," 2015 IEEE Symposium on Security and Privacy, May 17-21, 2015, San Jose, CA USA 104-121.

Liu et al., "Security Analysis of Electronic Payment Protocols Based on Quantum Cryptography," 2017 4th International Conference on Information Science and Control Engineering, Jul. 2 1-23, 2017, Changsha, China, 1709-1712.

Anonymous: "Hierarchical Deterministic: Wallets—BIP32", Feb. 2017, Retrieved from the Internet: URL:https ://github .com/bitcoin/bips/blob(11b0fa37bee4eac40c3albe059107868$bcc3392/bip-0032.mediawiki [retrieved on Jun. 20, 2018].

Anonymous: "How to properly secure cryptocurrencies exchanges—Ledger", Aug. 2016, Retrieved from the Internet: URL:https://www.ledger.fr/2016/08/08/hcpw-to-properly-secure-cryptocurrencies-exchanges/ [retrieved on Jun. 29, 2018].

Cryptomathic.com [online], "Understanding Hardware Security Modules", Sep. 13, 2017, retrieved on Dec. 31, 2018, retrieved from: URL<https:www.cryptomathic.com/newsevents/blog/understanding-hardware-security-modules-hsms>, 10 pages.

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

Wired.com [online], "Crypto anchors' might stop the next Equifax-style megabreach," Oct. 11, 2017, retrieved from: URL<https://www.wired.com/story/crypto-anchors-breach-security/>, 11 pages.

* cited by examiner

700

Transmit, by a server computer of a cryptoasset custodial system, an approval request for a cryptoasset transaction associated with a cryptoasset in accordance with a policy stored in a hardware security module, the policy specifying at least one specific approver required for approval of the cryptoasset transaction, the approval request transmitted to a computer device associated with the at least one specific approver and configured to cause the computer device to prompt the at least one specific approver to approve the cryptoasset transaction
704

Receive, by the server computer, a security key from a hardware security token associated with the at least one specific approver, the security key indicating an approval of the cryptoasset transaction
708

Authenticate, by a risk analysis module of the cryptoasset custodial system, an identity of the at least one specific approver based on the security key, the risk analysis module communicably coupled to the server computer
712

Responsive to the authenticating of the identity of the at least one specific approver, sign by the hardware security module, the cryptoasset transaction using a cryptographic key stored in the hardware security module, the cryptographic key being a private key of an asymmetric cryptographic key pair associated with the cryptoasset transaction and usable to control access to the cryptoasset
716

Perform, by the server computer, the cryptoasset transaction on the cryptoasset using the cryptographic key
720

FIG. 7

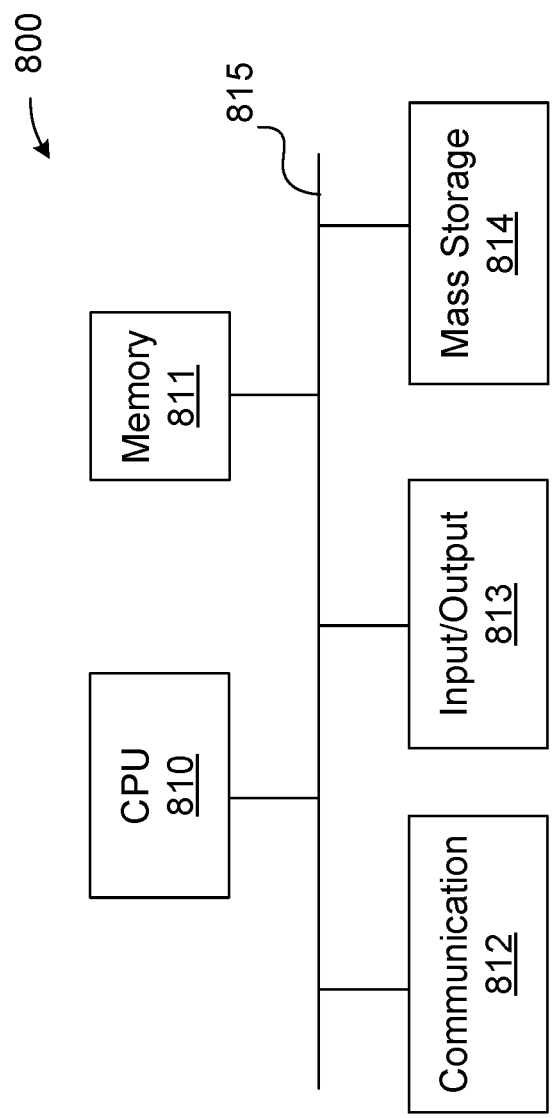

RISK MITIGATION FOR A CRYPTOASSET CUSTODIAL SYSTEM USING A HARDWARE SECURITY KEY

CROSS-REFERENCE TO RELATED APPLICATIONS

This application is a continuation of and claims the benefit of priority to U.S. patent application Ser. No. 17/386,624, filed Jul. 28, 2021, which is a continuation of U.S. patent application Ser. No. 16/580,931, filed Sep. 24, 2019, now U.S. Pat. No. 11,100,497, issued Aug. 24, 2021, which claims the benefit of priority to U.S. Patent Application No. 62/889,393, filed Aug. 20, 2019, each of which is incorporated by reference herein.

TECHNICAL FIELD

This description relates generally to risk mitigation for a cryptoasset custodial system.

BACKGROUND

Cryptocurrencies such as Bitcoin, Ethereum, Ripple and others have gained in popularity and value in recent years and are expected by many to continue to do so. Every day an increasing variety of transactions are conducted based on cryptocurrencies, and it is conceivable that new types of cryptographic assets may be created in the future, i.e., cryptographic assets that are not necessarily currencies.

With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" are sometimes used to store cryptocurrency, however, those devices limit access only to the owner of the device and are therefore not suitable for many business uses, where a number of individuals may require access to cryptographic funds or other cryptoassets.

SUMMARY

This specification describes risk mitigation for a cryptoasset custodial system (sometimes referred to as a "CCS"). Methods, systems, and apparatus for risk mitigation for the cryptoasset custodial system include using a server computer of the cryptoasset custodial system to transmit an approval request for a cryptoasset transaction. The approval request is transmitted in accordance with a policy stored in a hardware security module of the cryptoasset custodial system. The policy can specify at least one specific approver of the cryptoasset custodial system required for approval of the cryptoasset transaction. The approval request is transmitted to a computer device associated with the specific approver. The approval request can be configured to cause the computer device to prompt the specific approver to approve the cryptoasset transaction.

The server computer receives a security key from a hardware security token associated with the specific approver. The security key indicates an approval of the cryptoasset transaction. A risk analysis module of the cryptoasset custodial system can authenticate an identity of the specific approver based on the security key. Responsive to the authenticating of the identity of the specific approver, the hardware security module can sign the cryptoasset transaction using a cryptographic key stored in the hardware security module. The cryptographic key is a private key of an asymmetric cryptographic key pair associated with the cryptoasset transaction and usable to control access to the cryptoasset. The server computer performs the cryptoasset transaction on the cryptoasset using the cryptographic key.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 7 illustrates a process for risk mitigation for the cryptoasset custodial system.

FIG. 8 is a high-level block diagram showing an example of a hardware architecture of a processing system that can be used to implement some or all of the cryptoasset custodial system or a user device.

DETAILED DESCRIPTION

Figure 1:
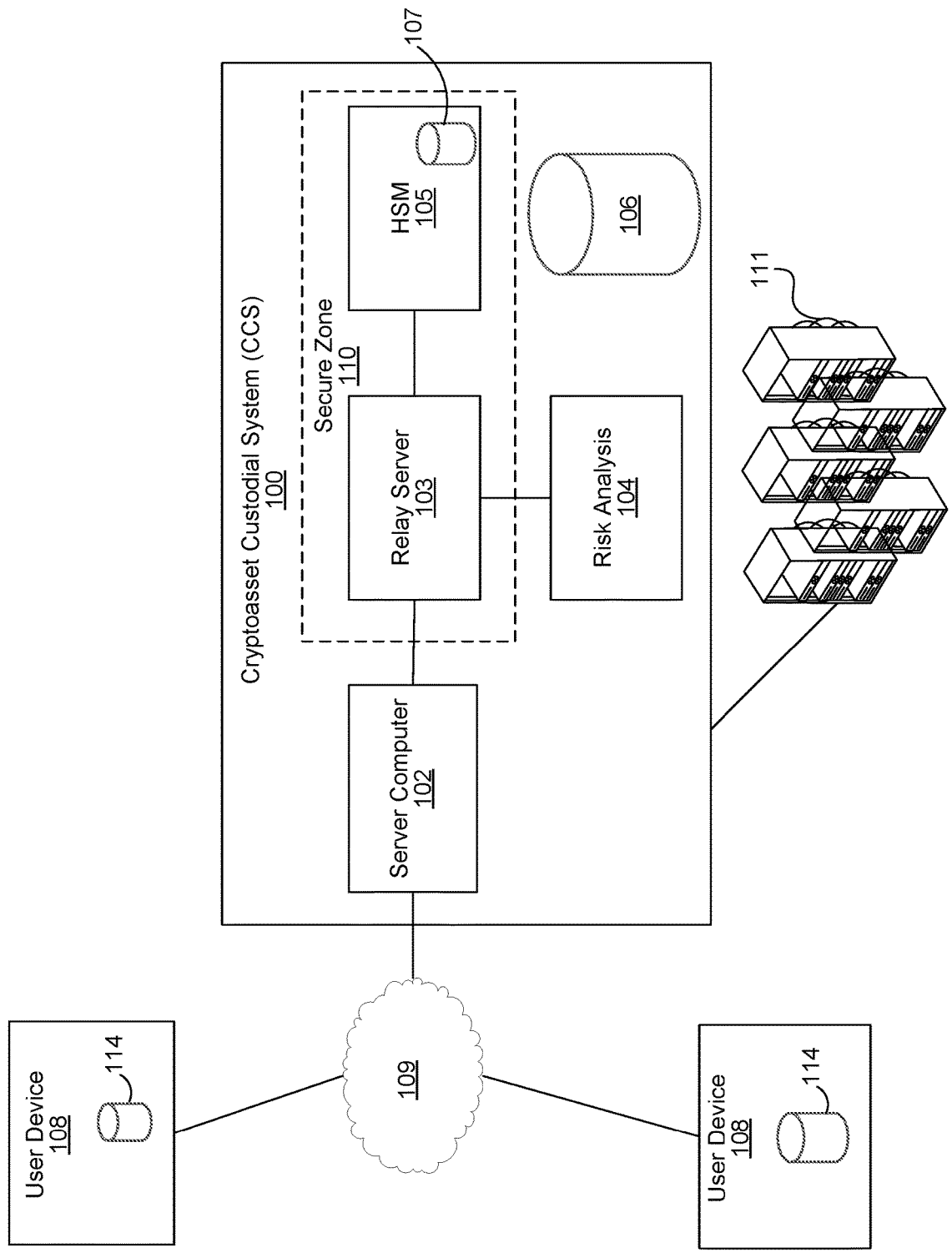
FIG. 1 illustrates an example block diagram of a cryptoasset custodial system.

In the following description, for the purposes of explanation, numerous specific details are set forth in order to provide a thorough understanding of the disclosed embodiments. It will be apparent, however, that the embodiments may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

FIG. 1 illustrates an example block diagram of a cryptoasset custodial system 100. The cryptoasset custodial system 100 is a computer-implemented system for maintaining custody of, and controlling access to, cryptocurrencies and/or other cryptoassets. The cryptoasset custodial system 100 may be owned and/or operated by a business enterprise, referred to herein as the Cryptoasset Custodian. The cryptoasset custodial system 100 includes multiple layers of security so as to enable large volumes of cryptoassets to be maintained in a secure manner. In certain embodiments the cryptoasset custodial system 100 includes a combination of biometric-based multi-user validation, transaction risk analysis, and use of a hardware security module 105 to provide authentication/validation functionality and secure storage of private keys of cryptoassets. Furthermore, two or more different biometric authentication techniques may be applied to any given transaction request. As used herein, the term "hardware security module" refers to a special-purpose physical computing device that safeguards and manages digital keys for authentication and provides cryptoprocessing functionality. The hardware security module 105 can be embodied as a plug-in card or an external device that attaches directly to a computer.

In certain embodiments, when a user device 108 requests a transaction involving a cryptoasset, such as a withdrawal of transfer of cryptocurrency funds, the cryptoasset custodial system 100 causes an endorsement request message to be sent to each of multiple user devices 108, each of which is associated with a different user who has been defined as potential member of a quorum for transactions involving that cryptoasset (in other embodiments, multiple users may share the same user device 108). The endorsement request message is configured to cause each receiving user device 108 to prompt its endorser/user to provide an endorsement of the requested transaction. An endorsement in such a context is an approval or rejection of an operation by an endorser/user. When an endorser/user receiving such a prompt endorses the transaction on their user device 108 (e.g., a smartphone, tablet or notebook computer), the user device 108 signs an endorsement with a private key of that user and transmits the signed endorsement to the cryptoasset custodial system 100. The private key is stored within a secure enclave 114 within the user device 108. A secure enclave 114 in each user device 108 is used to store the corresponding user's private key and to generate digital signatures of that user.

The hardware security module 105 determines whether a policy-based quorum of multiple users has endorsed (approved) a requested action, such as a withdrawal or transfer of cryptocurrency funds. The hardware security module 105 validates the signature by a public key of a public-private key pair for each of the plurality of users, in endorsements received from the users. In one implementation, only after determining that the policy-based quorum of the multiple users has validly endorsed the requested action, the hardware security module 105 allows itself to access or derive the private key of that particular cryptographic asset (e.g., for a specific deposit of cryptocurrency funds), and uses that private key to sign the transaction as authorization that the transaction may proceed.

The private key of the particular cryptographic asset may be accessed or derived using a client key and the client key can be derived from an encrypted client key stored on one or more user devices for authorized representatives of the client. The encrypted client key can be transmitted to the hardware security module and the hardware security module can derive the client key from the encrypted client key by decrypting the encrypted client key using the hardware-based cryptographic key stored within the secure storage device of the hardware security module. The hardware-based cryptographic key within the secure storage device of the hardware security module is stored only in the hardware security module 105, thus the hardware-based cryptographic key cannot be read by any entity outside the hardware security module 105. Approval of the transaction may include, for example, transmitting the transaction onto a known blockchain network. In certain embodiments, approval of the transaction by the hardware security module 105 occurs only if and after the requested transaction has passed a risk review, which may be partially or fully automated. The system and techniques introduced here can also be used for secure custody of other types of digital assets besides cryptoassets.

Refer now to FIG. 1, which shows a high-level block diagram of the cryptoasset custodial system 100. In the illustrated embodiment, the cryptoasset custodial system 100 includes a server computer 102, a relay server 103, a risk analysis module 104, the hardware security module 105, and a data storage facility 106. The data storage facility 106 may include one or more databases, which can be or include relational databases or any other type of mechanism for storing data in an organized way, where the data may be structured data and/or unstructured data. The hardware security module 105 also includes its own internal secure storage facility 107. Note that there can be multiple instances of each of the above-mentioned components in the cryptoasset custodial system 100, even though only one of each is shown to simplify description. One or more user devices 108, also called "clients," can communicate with the cryptoasset custodial system 100 via a public computer network 109, such as the Internet. Each of the user devices 108 may be any one of, for example, a smartphone, tablet computer, laptop computer, desktop computer, or the like. Each user device 108 may include a secure enclave 14, such as an iOS-based secure enclave, which is used to store the corresponding user's private key and to generate digital signatures of that user. In at least some embodiments, each user device 108 is associated with a different user, and the description herein henceforth assumes such an embodiment to facilitate description. Note, however, that it is possible to have embodiments in which multiple users share the same user device 108.

In some embodiments, the relay server 103 functions as a bridge over a physical air gap to isolate the hardware security module 105 from the public computer network 109. In other embodiments, the relay server 103 functions as a virtual air gap to isolate the hardware security module 105 from the public computer network 109. The relay server 104 and hardware security module 105 operate within a secure zone 110. The hardware security module 105 may physically reside in a physically secured datacenter with no direct access to any outside network. Messages between the hardware security module 105 and the server computer 102 are routed on a half-duplex (outbound request-responses only) connection to the relay server 103 in the secure zone 110. The relay server 103 disconnects itself from the secure network while communicating with the server computer 102, and disconnects itself from all external networks while communicating with the hardware security module 105, such that no interactive sessions with those devices can be established from the outside. The relay server 103 provides "air gap" security to critical infrastructure. The cryptoasset custodial system 100 also has access to at least one blockchain network 111 that records cryptoassets of which the cryptoasset custodial system 100 has custody. Access to the blockchain network 111 may be via the public computer network 109, e.g., the Internet.

In some embodiments, each transaction submitted by a customer of the cryptoasset custodial system 100 will go through the risk analysis module 104, which may be partially or fully automated. For example, with some embodiments of the cryptoasset custodial system 100, a risk analysis agent (also referred to as an "approver") may evaluate the output of automated risk analysis software displayed on a risk review dashboard, to make a decision on whether a transaction has been sufficiently authorized to be accepted. The approver or the software can follow a policy set on each individual vault and can look at any of various risk signals (e.g., the amount being transacted, how many users have authorized the transaction, the location(s) from which the transaction was requested and approved, the destination address) to compute a final risk metric that might lead to the transaction being approved or more information being requested.

Figure 2A:
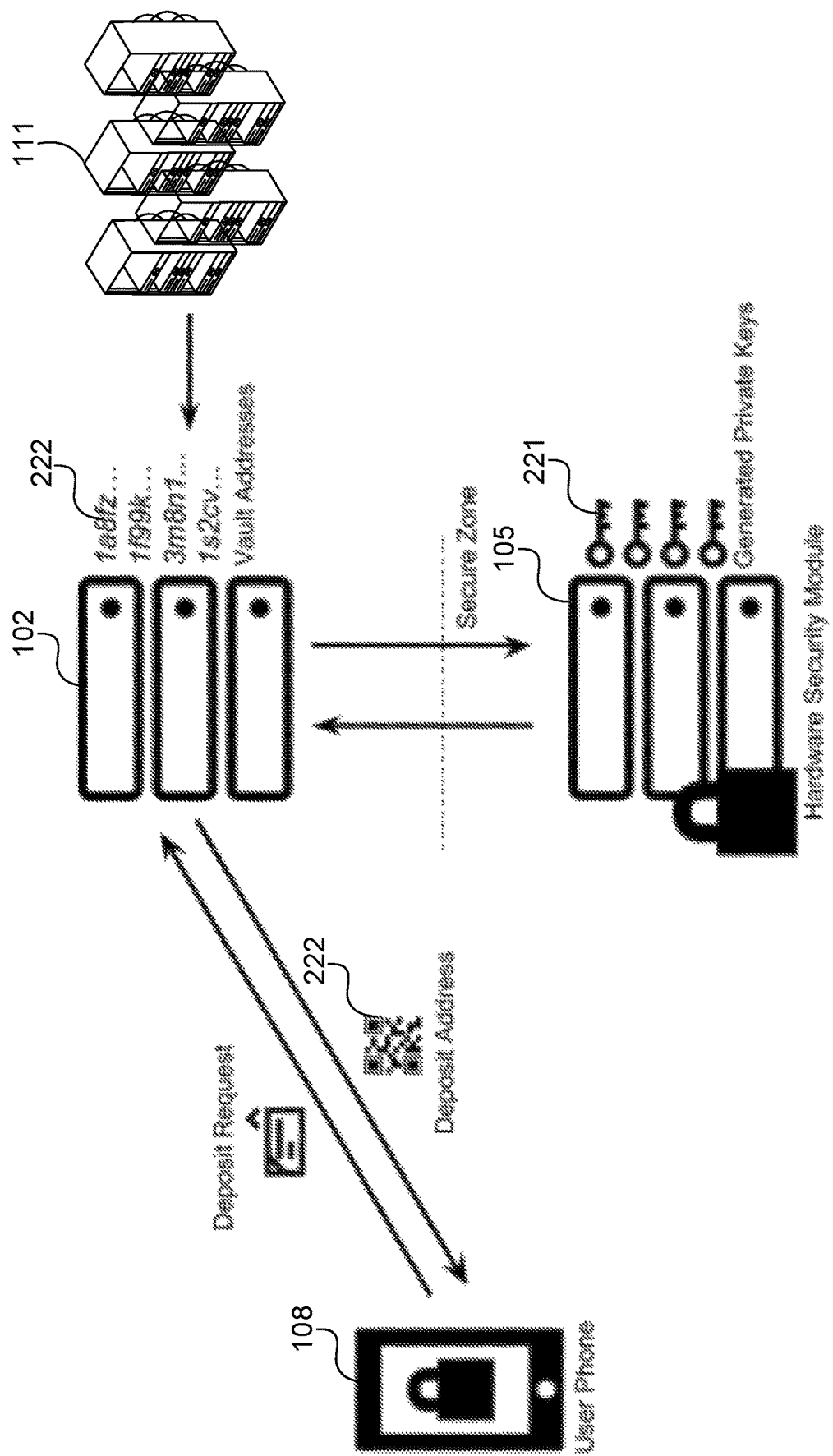
FIG. 2A is a schematic diagram illustrating an example of a deposit process flow with the cryptoasset custodial system.
Figure 2B:
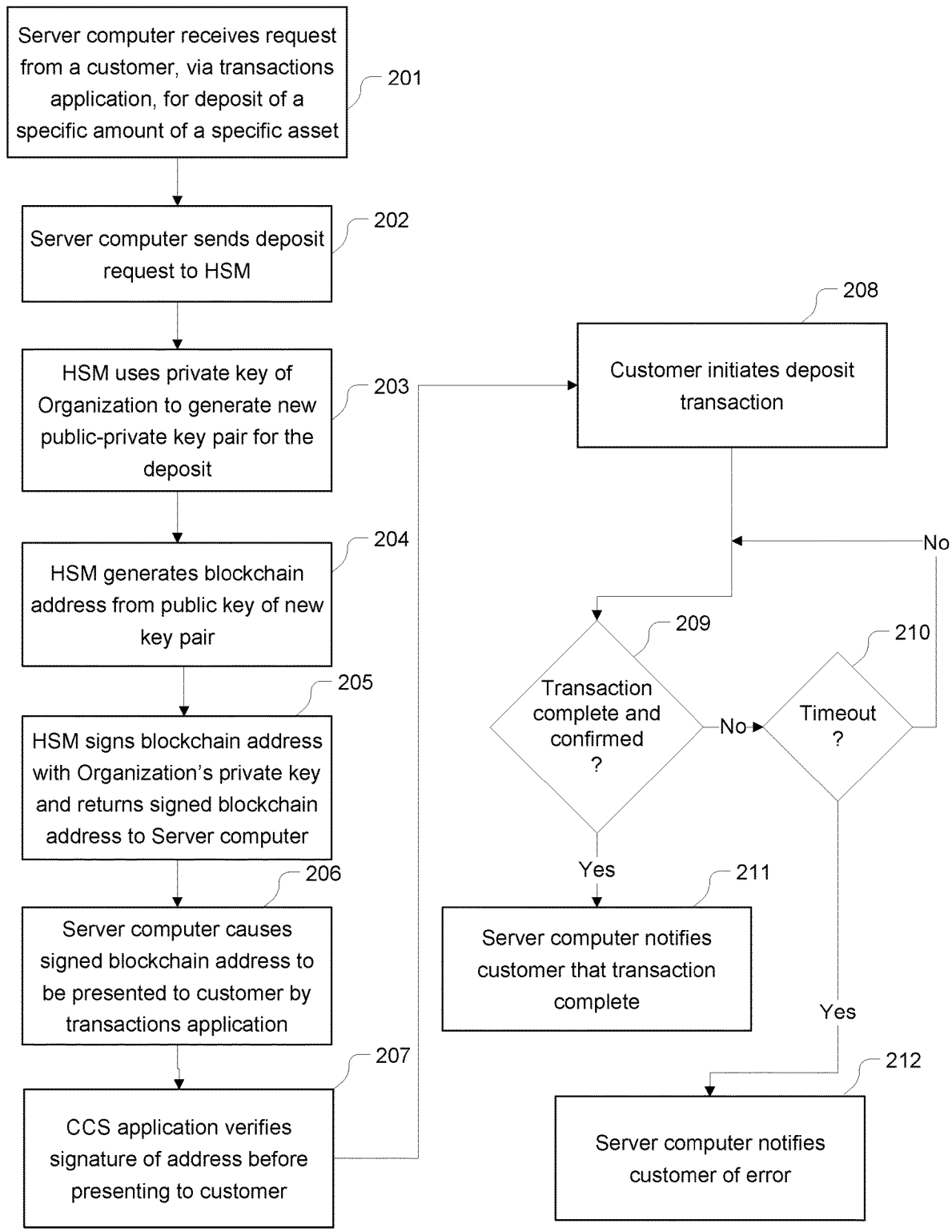
FIG. 2B is a flow diagram illustrating an example of the deposit process flow.

FIG. 2A is a schematic diagram illustrating an example of a deposit process flow with the cryptoasset custodial system 100. FIG. 2B is a flow diagram illustrating an example of the deposit process flow. In some embodiments, deposits are initiated by a customer via the Internet through a software application (hence referred to as the "cryptoasset custodial system application") executing on a user device 108 of the customer. In some embodiments, the initiation of deposit operations is performed using the web dashboard. Such initiation of a deposit request requires a cryptographic endorsement to be performed on the cryptoasset custodial system application.

The initiation of a deposit can be performed by the customer's selecting a cryptoasset type and requesting a deposit for a given amount in the cryptoasset custodial system application. Once initiated, the request for a blockchain deposit address is sent to the server computer 102, which receives the request (step 201) and forwards it (step 202) via the relay server 103 to the hardware security module 105 (which as noted above is isolated from the Internet by the relay server 103). The hardware security module 105 generates (step 203) a new public-private key pair 221 to correspond uniquely with the deposit, i.e., to correspond with the requested blockchain address. In certain embodiments, the hardware security module 105 uses the private key of the relevant Organization and a key derivation function (KDF) to generate the new key pair for the blockchain address. An "Organization" in such a context is a data structure that corresponds to a particular customer, as discussed further below. In one implementation, the private key of the newly generated key pair cannot be extracted from the hardware security module 105, but can be backed up securely in an encrypted file. In this implementation, key generation inside the hardware security module 105 ensures that the private keys 221 only exist within the hardware security module 105, are not available anywhere else in the world and cannot be accessed by any entity that is external to the hardware security module 105.

The hardware security module 105 next generates (step 204) the blockchain address for the deposit from the public key of the newly-created key pair. A blockchain-specific transformation of the public key of the blockchain address can be used. The hardware security module 105 signs (step 205) the blockchain address with the Organization's private key and returns the signed blockchain address to the server computer 102. The server computer 102 causes (step 206) the signed blockchain address 222 to be sent to the customer's user device 108, to cause the user device 108 to present the address to the customer in the cryptoasset custodial system application on a user device 108, in an easy-to-consume and shareable format (e.g., as a QR code), for use as a destination address in a blockchain transaction. The cryptoasset custodial system application on the user device 108 verifies (step 207) the signature of the address before presenting the address to customer.

The customer's user device 108 uses the public key of the Organization (which it previously received from the cryptoasset custodial system 100 and locally stored) to verify the authenticity of the blockchain address it receives from the cryptoasset custodial system 100. The customer initiates (step 208) a transaction to deposit assets into the cryptoasset custodial system 100. The transaction might be initiated from an exchange, from the customer's personal wallet, or from another cryptoasset store. No confirmation is required for the assets to show up in the cryptoasset custodial system 100.

The address of the deposit is stored in a collection with other addresses belonging to the customer in the cryptoasset custodial system 100, known as the customer's "vault." A vault in such a context is a data entity that contains cryptoassets and a policy map containing one or more policies governing deposits and withdrawals from those cryptoassets as well as participation in transactions related to the cryptoassets. A cryptoasset is represented as a slot inside a vault that can hold an amount of a cryptoasset type (e.g., Bitcoin, Ethereum). Once under custody and stored with the cryptoasset custodial system 100, a cryptoasset is completely under the control of the cryptoasset custodial system 100.

The server computer 102 determines whether the customer has confirmed the transaction within the defined time period (steps 209, 210). Once the deposit transaction is confirmed by customer and confirmed on the blockchain, the customer is so notified (step 211) by the server computer 102, and the assets are considered to be under custody of the cryptoasset custodial system 100. In the event confirmation is not received within the defined time period, the server computer 102 notifies (step 212) the customer of an error in the transaction.

Figure 3A:
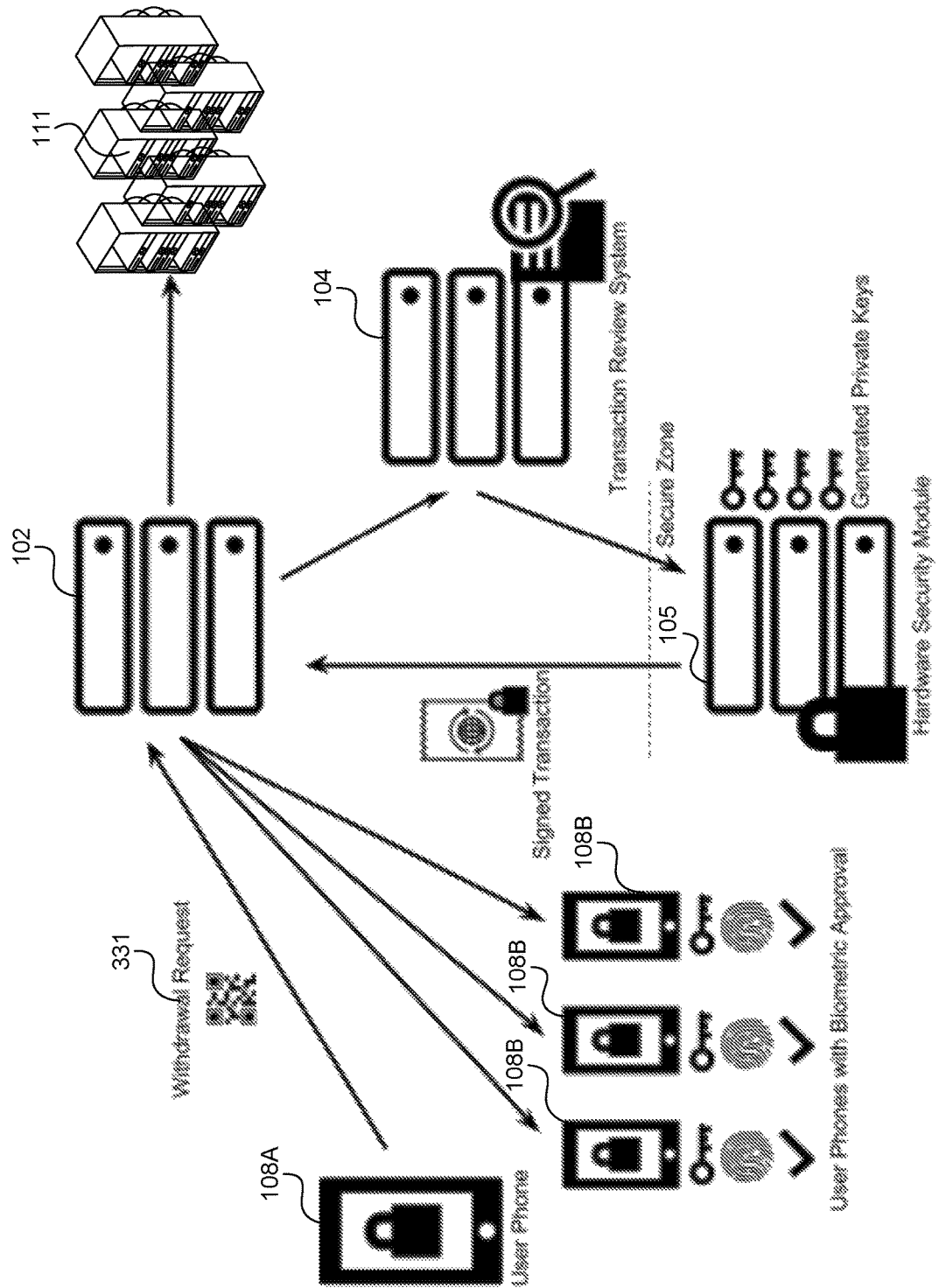
FIG. 3A is a schematic diagram illustrating an example of a withdrawal process flow with the cryptoasset custodial system.
Figure 3B:
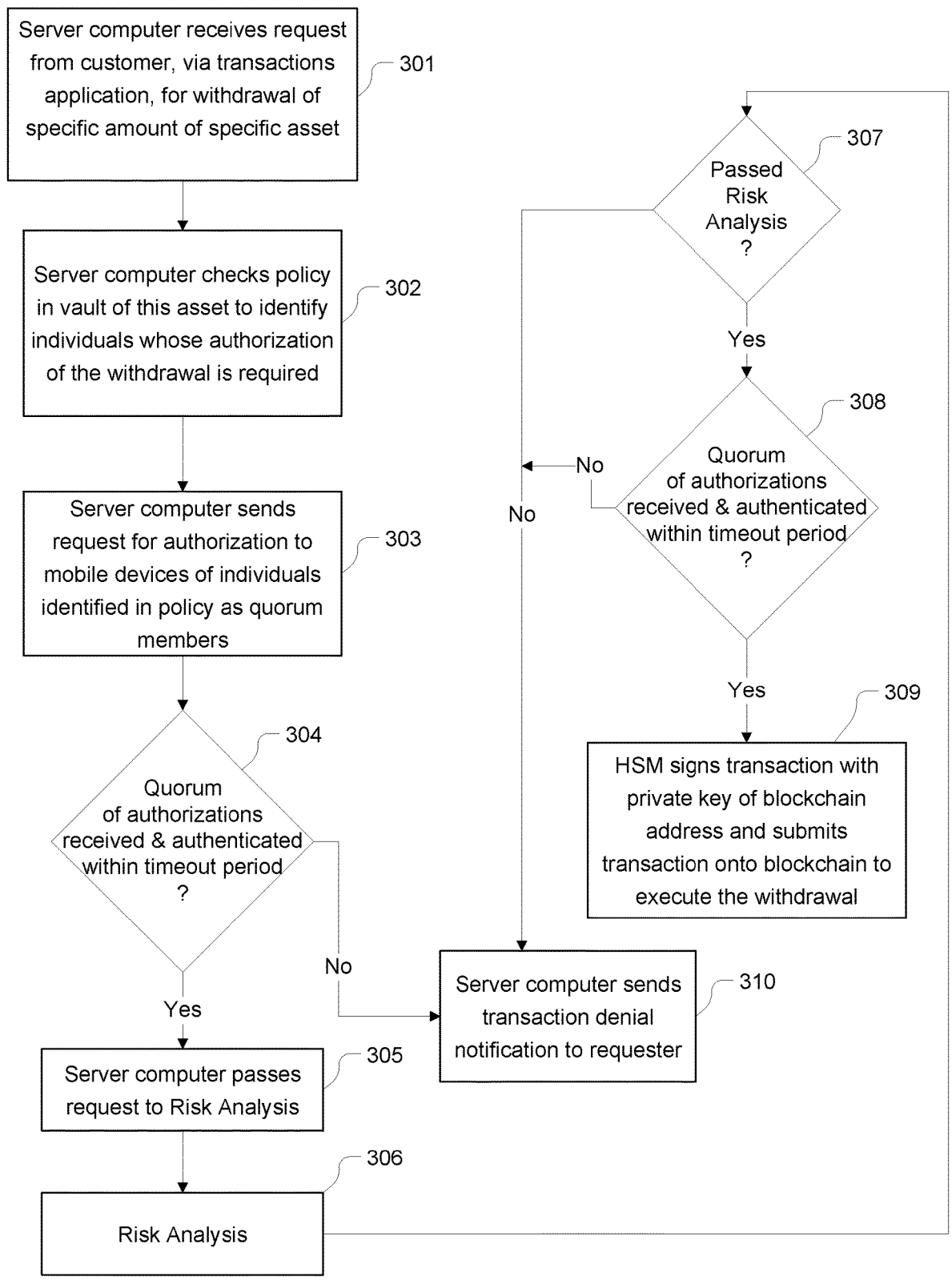
FIG. 3B is a flow diagram illustrating an example of the withdrawal process flow.

FIG. 3A is a schematic diagram illustrating an example of a withdrawal process flow with the cryptoasset custodial system 100. FIG. 3B is a flow diagram illustrating an example of the withdrawal process flow. FIGS. 3A and 3B illustrate an example of the process of withdrawing an amount of a previously deposited cryptoasset, such as a cryptocurrency. Withdrawals can be initiated from the cryptoasset custodial system application on a user device 108A by selecting a specific cryptoasset to withdraw and an amount. Once initiated, authorizing parties are made aware of the withdrawal request. In one implementation, a quorum of authorized customers or users is required to authorize the withdrawal request individually on their mobile devices 108A and 108B. In some embodiments, one or more "required" customers or users are required to authorize the withdrawal request. The one or more "required" customers or users can be part of the quorum. In some embodiments, the defined quorum must be met and all the "required" users must have authorized the transaction. In some embodiments, conditional definitions for "required" users can be implemented. For example, "Require Joe Doe if the USD valuation is above $1 million or if the transaction amount is more than 50% of the holdings for the cryptoasset at a given time." In other embodiments, additional required approvals or conditions are configured for a "policy" to be satisfied.

During this process, authorized users are required to review the transaction and approve it, where each user's approval can be subject to biometric authentication (e.g., fingerprint, facial recognition and/or voice recognition). In certain embodiments, before a withdrawal can successfully move on to the next phase, every request is sent to the risk analysis module 104 to be inspected for suspicious activity and authorized as legitimate. The hardware security module 105 can validate that a defined quorum (e.g., a majority, 25%, or 33%) of users have authorized the transaction, and that the transaction was approved by the risk analysis module 104. For example, for a given corporate customer that has five distinct employees who need the ability to transfer funds, a suitable quorum configuration might be to require validated approval from a group of three of those five employees to move any funds. Once the hardware security module 105 validates compliance with a policy map including any quorum requirements, the hardware security module 105 authorizes the requested transaction, e.g., a requested withdrawal, by signing the requested transaction with the private cryptoasset specific key of the account holder. The server computer 102 submits the signed transaction request to the blockchain 111.

An example of the withdrawal process is further illustrated in FIG. 3B. The server computer 102 initially receives (step 301) the withdrawal request 331 from the customer. The server computer 102 checks (step 305) the approval policy for the cryptoasset that is the subject of the transaction, as indicated in the vault of the cryptoasset, to determine which individuals' authorizations (endorsements) may be used to satisfy a quorum to approve the withdrawal. The server computer 102 sends (step 306) endorsement requests to the mobile devices 108A, 108B of those individuals (the mobile devices have been previously registered with the cryptoasset custodial system 100). In response to these requests, one or more endorsements may be received from users' mobile devices 108A, 108B, where the endorsements were signed locally by the users' respective private keys stored securely in their respective mobile devices and subjected to one or more biometric authentication techniques, as described further below. Accordingly, the server computer 102 determines (step 304) whether, within a timeout period, a quorum of authorizations have been received and the corresponding authorizing parties have been authenticated, as specified in the policy for the cryptoasset. If so, the server computer 102 passes (step 305) the transaction request 331 to the risk analysis module 104. Otherwise, the server computer sends (step 310) a transaction denial notification to at least the user who requested the transaction (and possibly to all other users identified in the policy for the cryptoasset).

The risk analysis module 104 can perform a risk analysis (step 306), which as noted above may be fully or partially automated. If the transaction passes risk analysis (step 306), control flow is passed to the hardware security module 105, which verifies (step 308) whether the quorum requirement has been satisfied, by performing the same determination as step 304 or a similar determination, as does the risk analysis module 104 (step 306) (described further below). If satisfaction of the quorum is verified by the hardware security module 105, the hardware security module 105 signs the withdrawal transaction with the private key of the blockchain address. The server computer 102 submits the transaction onto the blockchain 111 to execute the withdrawal (step 309). Otherwise, the hardware security module 105 signals a failure to the server computer 102, which in response sends (step 310) a transaction denial notification to at least the user who requested the transaction (and possibly to all other users identified in the policy for the cryptoasset).

As mentioned above, when a user endorses a transaction request, they can be subjected to one or more forms of authentication by their mobile device and/or the cryptoasset custodial system 100, to establish that they are the expected person taking the action. These authentication forms can include one or more biometric authentication techniques, such as fingerprint verification, voiceprint verification, speech recognition, facial recognition and/or gesture recognition. The user's mobile device (e.g., smartphone) can perform one or more of these authentication techniques.

Additionally, or alternatively, the user may be required to upload to the cryptoasset custodial system 100 a video, captured by their mobile device, from which their identify can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, destination, etc., the cryptoasset custodial system 100 may generate a random number that can be used to select a few (e.g., three to five) words from a set of known words. The cryptoasset custodial system 100 may present those words to the user and have the user speak them in a video captured by the user's mobile device, which the user's mobile device transmits to the cryptoasset custodial system 100. When reviewing the transaction, the reviewing mechanism can independently generate the expected words based on transaction data and verify that the user spoke those words. The video can also be subject to facial and/or voice recognition. By performing the deterministic challenge generation, an attacker can be prevented from faking a transaction by capturing and reusing previously transmitted authentication videos from the user.

Figure 4:
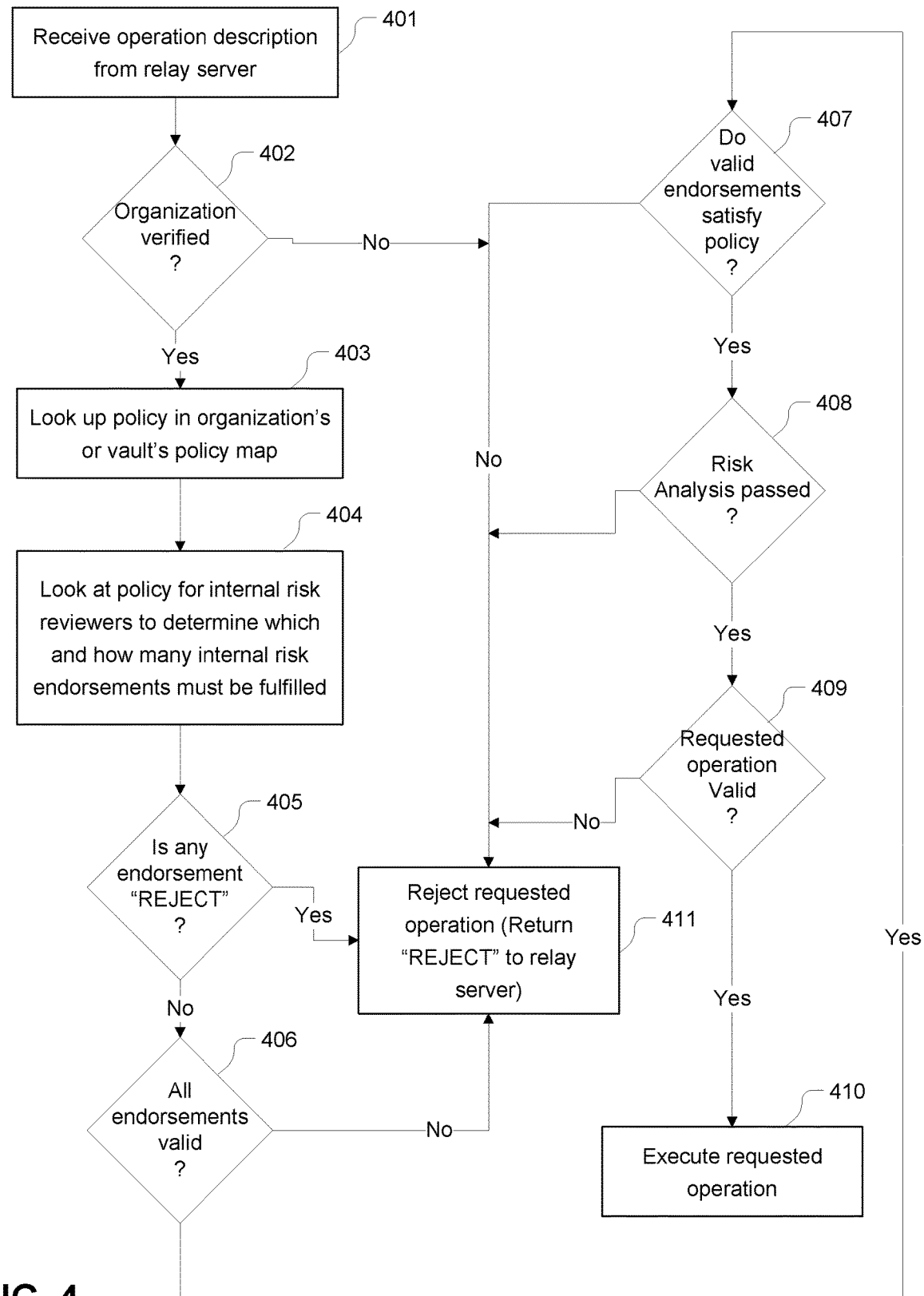
FIG. 4 is a flow diagram illustrating an example of a process performed by a hardware security module in connection with a requested operation.

FIG. 4 is a flow diagram illustrating an example of a process performed by a hardware security module 105 in connection with a requested operation. The main role of the hardware security module 105 is to verify the validity of operations. The hardware security module 105 carries out the will of the signers and authenticates that the signers are the authorized parties of an operation through the hardware security module 105's privileged access to keys. At least one key needed for signing transactions is stored securely in the hardware security module 105 and never leaves it. In some embodiments, the hardware security module 105 enforces these policies through a Secure Execution Environment (SEE) that runs code that cannot be changed except through physical access to the hardware security module 105 and requires a set of smartcards held securely by multiple employees of the Cryptoasset Custodian.

In certain embodiments, to facilitate the above-mentioned functionality the hardware security module 105 stores, in its internal storage 107, multiple instances of a data structure called "Organization," i.e., one instance for each customer of the Cryptoasset Custodian. In one implementation, the Organization data structure can contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies, including one policy for each possible action that may be carried out (e.g., add user or change vault policy). An Organization data structure is signed by the hardware security module 105, using the Organization's private key (which cannot be read by any external entity), to indicate that it was produced through a valid set of changes authorized by the users and risk reviewers. In some embodiments, the hardware security module 105 keeps track of the most recent version to prevent rollback attacks. In other embodiments, the hardware security module 105 code is versioned and there are checks in the upgrade process to prevent rollback attacks.

To onboard a new customer, the hardware security module 105 creates a new Organization instance. To help ensure adequate security, the hardware security module 105 may create the Organization for a requested set of users. In some embodiments, the hardware security module 105 generates new unique keys for every new Organization created. Thus, an attacker is prevented from attempting to spoof or duplicate identities (IDs) with existing organizations, since every organization has a unique organization key.

FIG. 4 illustrates an example of a process that may be performed by the hardware security module 105, in at least some embodiments, in response to a request to carry out an operation. The request may be received by the hardware security module 105 from the relay server 103. Initially, the hardware security module 105 receives (step 401) from the relay server 103 an operation description, which specifies an Organization. The operation description is a set of data and metadata describing a requested operation, such as a requested deposit, withdrawal or transfer of cryptocurrency. The hardware security module 105 verifies (step 402) the integrity of the specified Organization.

The hardware security module 105 looks up the policy in the Organization's or the vault's policy map (step 403). The hardware security module 105 looks at the policy for internal risk reviewers to determine which and how many internal risk endorsements (i.e., endorsements by personnel of the Cryptoasset Custodian) must be fulfilled (step 404). The hardware security module 105 can determine (step 405) whether any of the received cryptographic endorsements (from users) indicate to "REJECT" the requested operation. If so, the hardware security module 105 can reject (step 411) the requested operation, by returning a "REJECT" message to the relay server, which returns a corresponding "REJECT" message to the server computer, to cause notification to the requester. The hardware security module 105 does not bother checking any further signatures and rejects the operation.

The hardware security module 105 determines (step 406) whether all of the received cryptographic endorsements for the transaction are valid. The determination includes verifying the validity of the cryptographic endorsements provided by checking that: i) the user is in the Organization, ii) the signature is correct for the specified operation, and iii) each of the signatures has an "APPROVE" decision. If not all of the received cryptographic endorsements for the transaction are valid, the process proceeds to step 411 as described above.

If all received endorsements for the transaction are valid, the hardware security module 105 determines (step 407) whether the endorsements satisfy the relevant policy for the subject cryptoasset (satisfy the specified quorum). If the valid endorsements do not satisfy the policy, the process proceeds to step 411 as described above. If the endorsements satisfy the policy, the hardware security module 105 determines (step 408) whether the requested operation passed the risk analysis module 104. If not, the process proceeds to step 411 as described above. If the requested operation passed the risk analysis module 104, the hardware security module 105 determines (step 409) whether the requested operation is valid. The determining step can include verifying that the operation is internally consistent and that the operation can be applied to the Organization, vault or asset that it targets. If the requested operation is not valid, the process proceeds to step 411 as described above. Otherwise, the hardware security module 105 executes (step 410) the requested operation (or triggers an action to cause it to be executed). An operation to change the Organization, vault or policy results in a new signed Organization data structure with a higher generation value and the change applied to it. An operation to withdraw assets results in the hardware security module 105 signing a blockchain transaction with the private key corresponding to the subject asset. An operation to deposit assets results in the hardware security module 105 generating a deposit address.

Figure 5:
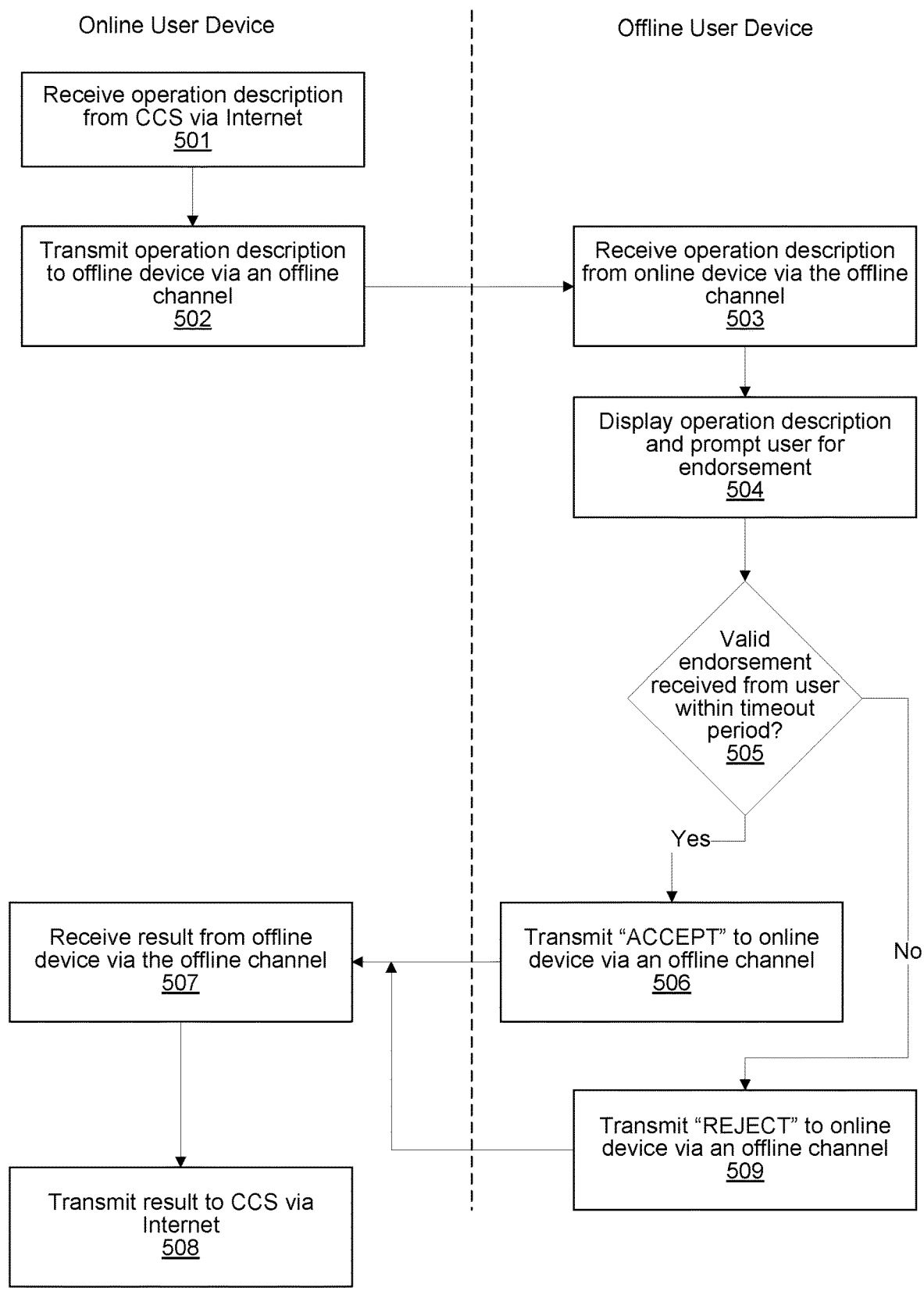
FIG. 5 is a flow diagram illustrating an example of a process for using an offline user device to endorse a requested transaction.

FIG. 5 is a flow diagram illustrating an example of a process for using an offline user device to endorse a requested transaction. As a method for reducing the risk for users interacting with the cryptoasset custodial system application on their personal devices, the cryptoasset custodial system 100 may require authorization from an offline device. The offline device, such as a consumer phone with secure enclave or similarly capable computing device such as an iPod Touch or personal digital assistant, will be completely disconnected from the Internet in its normal state, and used in an offline manner to sign transactions required for authorization.

The process may be carried out as follows. The user has a phone or similar device that is a member of their vault policy's quorum and is not connected to any wireless or cellular networks. The device runs software similar to the cryptoasset custodial system application software for enabling a user to endorse requested transactions, or the same software operating in a different mode. The user initiates a transaction against their vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. The transmission can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the server computer of the cryptoasset custodial system 100.

In FIG. 5, an online user device receives (step 501) an operation description from the cryptoasset custodial system 100 via the Internet. The online user device (e.g., user device 108) transmits (step 502) the operation description (or a portion thereof) to the offline user device using an offline channel. As noted above, the offline channel is a channel that is not accessible via the Internet, such as a local visual display by the online user device, a sound or sequence of sounds generated by the online user device, or a short range wireless transmission from the online user device (e.g., via Bluetooth). The offline user device receives the operation description (step 503) from the online user device via the offline channel, and based on the information thereby received, displays the operation description (or portion thereof) and prompts the user for endorsement of the operation (step 504). If a valid endorsement is received by the offline device (step 505) as user input within a timeout period, the offline device transmits an "ACCEPT" message (step 506) to the online user device via the same offline channel by which it received the operation description, or via a different offline channel. The online user device receives the results of the endorsement from the offline device (step 507) and transmits the result payload to the cryptoasset custodial system via the Internet (step 508). If a valid endorsement is not received by the offline user device from the user within the timeout period (step 505), the offline user device transmits a "REJECT" message to the online user device via the offline channel, which in turn transmits the "REJECT" payload to the cryptoasset custodial system via the Internet (step 508).

The offline device may be delivered to the user with its secure key pre-enrolled in the Organization, or it may be allowed to be online for the initial enrollment process, or it may send its enrollment through a similar procedure to the authorization process.

The cryptoasset custodial system software on the offline device may need to be updated periodically. To allow such updates, the offline device may be scheduled to connect to the Internet via Wi-Fi and have its software updated at a predefined cadence, or it may detect that its software needs to be updated as a result of receiving a transaction to sign from the online user device, that indicates that the version of the software on the offline device is no longer compatible. Whenever the device is online, it can record as well as attempt to transmit to the cryptoasset custodial system 100 the fact that it can access the Internet so that that information may be used to assess risk by the platform at a later time.

In addition to being kept offline, the offline user device and one or more online devices may be restricted to act on a transaction only when in range of a predefined beacon. A wireless (e.g., Bluetooth) beacon device can be made available to the user, and the cryptoasset custodial system 100 application may refuse to authorize transactions unless it detects that the beacon is available.

Every transaction submitted to the cryptoasset custodial system 100 is recorded in an internal ledger that is tamper-resistant and that allows auditors to have cryptographic proof of every historical event on every user's account. The ownership of a blockchain asset is controlled by the possession of the private key corresponding to the public wallet address. The cryptoasset custodial system 100 can prove ownership of these assets to auditors by making use of the private key corresponding to a user's vault to sign a string of randomly chosen text chosen by the auditors. Consider the following example:

An auditor wishes to see proof that the cryptoasset custodial system 100 has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

```
{
  Address: 1ByBMSEYstn5Au4m4GFg7yJaNVN2 ,
  Token: " AUDIT-CHALLENGE- xGG8vQFnd8QDwHz6Uj1GX",
}
```

The cryptoasset custodial system 100 receives the challenge and forwards it to the hardware security module 105 as a predefined templated serialized package. The hardware security module 105 is programmed to accept and sign such audit requests (which are not arbitrary payloads and therefore are not at risk of being later interpreted as a signed blockchain transaction) with the private key associated with the specified address. The cryptoasset custodial system 100 returns the valid signature for the challenge that can be independently verified by the auditor. The verification proves that the cryptoasset custodial system 100 has control over a private key associated with an entry on the blockchain 111, achieving proof of control of the asset.

In certain embodiments, the cryptoasset custodial system 100 includes a Thresholding Service that enables other parts of the system (risk analysis module 104 and hardware security module 105) to securely determine that user operations and transactions have followed the customer specific business logic and have been approved by an automated risk review system. The Thresholding Service can verify multi-signature (multi-user) quorums.

The Thresholding Service validates operations initiated and approved by users to ensure that they've met a threshold quorum before being executed. Such operations may include transactions, adding or removing other users, etc. Different users can have different access control roles (e.g., view-only, initiate-transaction-only, authorizable, necessary). The cryptoasset custodial system 100 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 100 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The cryptoasset custodial system 100 may also allow thresholding across multiple required groups. For example, in a company a majority of the finance team may be required to sign off, as well as the front office.

In certain embodiments, the Thresholding Service implements a fine-grained access control model in its quorum verification, in which different users can have different access levels, which may include the following levels, for example:

View-only
    This is the default access level
    Users in this level can view all asset positions
    Users in this level can flag any transaction
    Users in this level can freeze all assets
View-authorize
    Users in this level can act as an authorizing vote for an action toward a quorum
    Users in this level can view all asset positions
    Users in this level can flag any transaction
    Users in this level can freeze all assets
View-authorize-necessary
    Users in this level are a required vote for an action
    Users in this level can view all asset positions
    Users in this level can flag any transaction
    Users in this level can freeze all assets In certain embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In certain embodiments, a user's signature is generated from an iOS secure enclave in the user's mobile device, and forwarded to the cryptoasset custodial system 100 by the iOS application programming interface (API) component in the user device 108. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the risk analysis module 104 to be further analyzed before sign-off by the risk analysis module 104, and will serialize the signature data into a payload to be consumed by the hardware security module 105 signing service. Each additional signature provided to the Thresholding Service and verification can be recorded in the append-only log service. The recording will provide additional auditing and status updates in addition to the metadata captured in the Thresholding Service's storage, which will be essential for providing consumable updates to user clients.

It is assumed that authorized members of a quorum are available to cryptographically sign transactions. Therefore, the quorum should be kept "live"—that is, at any given time, the cryptoasset custodial system 100 has reasonable confidence that all potential members of the quorum maintain possession of their secure device keys and can actively participate in a transaction. In certain embodiments, the cryptoasset custodial system 100 can do the following to achieve a level of confidence:

1. Have access to the set of user public keys required to fulfill a policy's quorums.

2. Set a liveness threshold for a policy, i.e., the amount of time after which one considers a key to be at risk of unavailability. The time can be fixed or related to normal transaction cadence.

3. Require users to periodically sign a proof transaction with their private keys. The signing can be explicit as a liveness check or hidden/implicit by requiring their key for routine operations such as login.

4. Record the latest live time of any one or more users' keys.

5. Continuously monitor whether any user's live time has exceeded the liveness threshold.

6. Use the above information to prompt the user to prove they still have access to their signing key and/or inform other users that the quorum may be at risk.

The risk analysis module 104 can implement an API, called the Risk API, and can further include review of all transactions and administrative user operations. In some embodiments the Risk API drives review system. The Risk API can provide integration with an internal risk dashboard, for review of each transaction.

The Risk API reverifies the appropriate threshold as determined by the Thresholding Service. The Risk API may also handle additional logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a classification system. The information may include, for example, user(s) who approved the transaction, time of approval(s), location of approval(s), and device/key ID(s) that approved the transaction. The data can be fed into an internal Risk Analysis process, and possibly other automated review systems.

In some embodiments, the Risk API obtains approval if a transaction passes the risk review process. To approve, the employee signs in using a security key from their hardware security token 604 if they approve the transaction/operation. The security key is presented to the Risk API (risk analysis module 104) as described in more detail below with reference to FIG. 6. There are preferably multiple security keys, one per risk reviewer (approver), and the system logs who performed the review. In certain embodiments, the system can rotate to a second risk-approval security key in case a first risk-approval security key is compromised. The use of the security key by the hardware security token 604 is illustrated and described in more detail with reference to FIG. 6.

Figure 6:
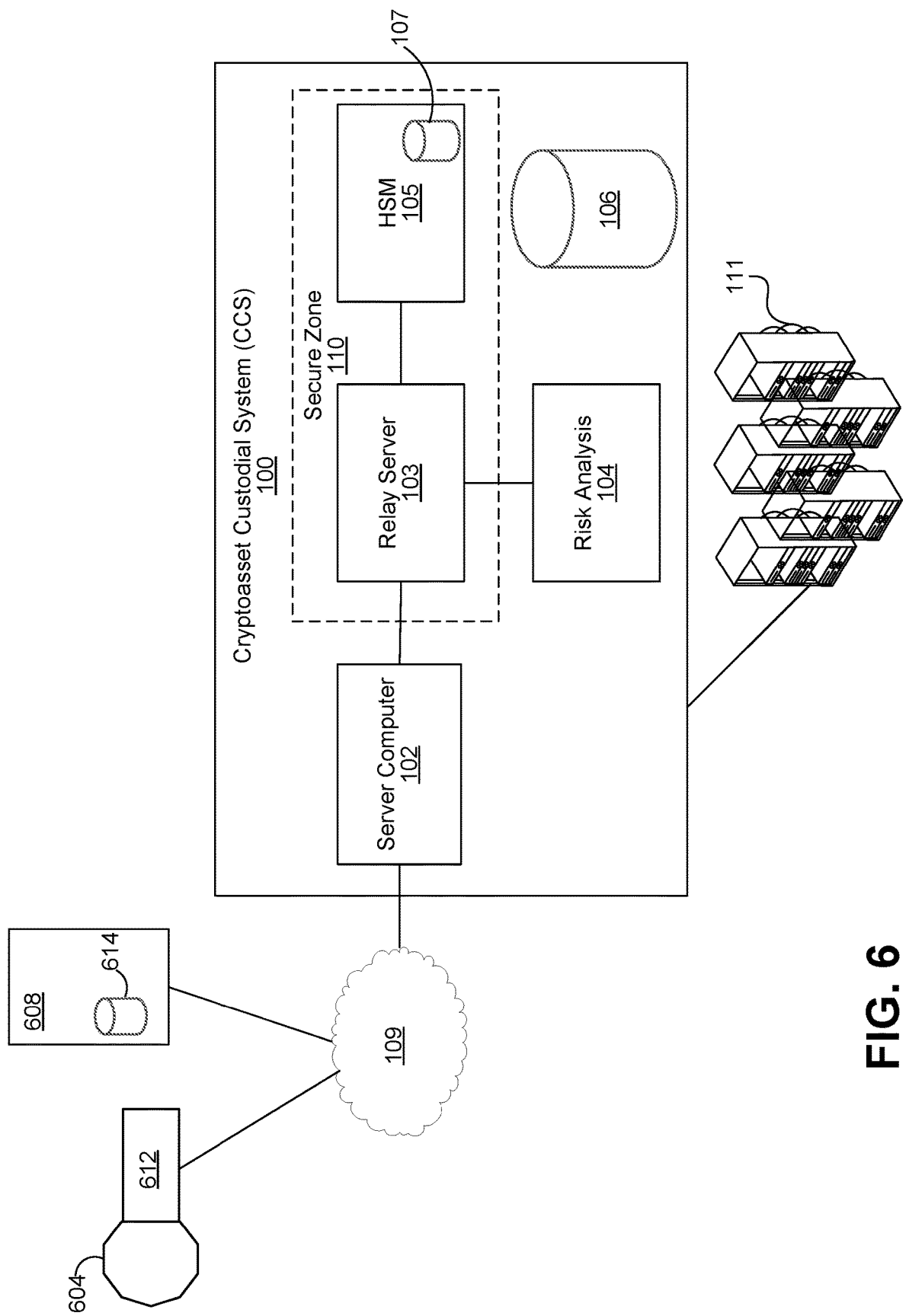
FIG. 6 illustrates an example block diagram of a cryptoasset custodial system performing risk mitigation using a hardware security key.

FIG. 6 illustrates an example block diagram of a cryptoasset custodial system 100 performing risk mitigation using a hardware security key. The cryptoasset custodial system 100 includes the server computer 102, the relay server 103, the hardware security module 105, the risk analysis module 104, and the data storage facility 106 as described in more detail with reference to FIG. 1.

The server computer 102 is a computer device including software that provides functionality for client programs and devices, such as the user device 108 illustrated and described in more detail with reference to FIG. 1. With reference to FIGS. 1 and 6, a computer device 608 belonging to an approver of the cryptoasset custodial system 100 communicates with the cryptoasset custodial system 100 over the network 109. The computer device 608 is a smartphone, tablet, laptop, or desktop associated with an approver of cryptoasset transactions to be performed by the server computer 102. For example, with some embodiments of the cryptoasset custodial system 100, automated risk analysis software can make a decision on whether a proposed transaction is acceptable. The approver can follow a policy set on each individual vault and can look at any of various risk signals (e.g., the amount being transacted, how many users have authorized the transaction, the location(s) from which the transaction was requested and approved, and/or the destination address) that might lead to the transaction being approved or more information being requested. The policy can be stored in the hardware security module 105 and can specify at least one specific approver, among other approvers, necessary to approve each transaction.

The server computer 102 can provide different functionalities, such as requesting the computer device 608 to approve a cryptoasset transaction, communicating with the hardware security module 105, and performing cryptoasset transactions on the blockchain 111 in response to a client request. Once a required quorum of users has endorsed a cryptoasset transaction associated with a cryptoasset, the server computer 102 transmits an approval request for the cryptoasset transaction to an authorized representative of the cryptoasset custodial system 100 in accordance with a policy stored in the hardware security module 105. The hardware security module 105 is communicably coupled to the server computer 102 through the relay server 103. The policy can specify, among other requirements, a specific approver of the cryptoasset custodial system 100 required for approval of the cryptoasset transaction. The approval request is transmitted to the computer device 608 associated with the specific approver. The approval request can also be transmitted to other approvers (required or non-required), such that a quorum of approvers approves the request.

The approval request is configured to cause the computer device 608 to prompt the specific approver and other approvers to approve the cryptoasset transaction. For example, the approval request can display text on a digital screen of the computer device 608, make a phone call to the computer device 608, send an e-mail to the computer device 608, open an application window on the computer device 608, or notify the computer device 608 in another manner. When the specific approver of the cryptoasset custodial system 100 approves a cryptoasset transaction on their computer device 608, the approver signs the approval with a security key from the hardware security token 604 and transmits the signed approval to the cryptoasset custodial system 100. Once the specific approver approves the cryptoasset transaction, the server computer 102 receives the approval of the cryptoasset transaction.

The hardware security token 604 is a physical device that an approver uses to gain access to an electronically restricted resource, such as the cryptoasset custodial system 100. The hardware security token 604 functions like an electronic key to authenticate an identity of the approver and indicate the approval, such that the generated security key can prove that the approver is who they claim to be. In some embodiments, the hardware security token 604 stores, within the secure enclave 612, cryptographic keys that are used to generate the security key in the form of a digital signature or biometric data, such as fingerprint details. In some embodiments, the hardware security token 604 stores one or more security keys or incorporates tamper resistant packaging. In some embodiments, the hardware security token 604 includes a small keypad to allow entry of a PIN or a simple button to start a generating routine that displays a generated key number or code on a display of the hardware security token 604. In some embodiments, the hardware security token 604 uses universal serial bus (USB), near-field communication (NFC), radio-frequency identification (RFID), or Bluetooth to connect to the cryptoasset custodial system 100. In other embodiments, the hardware security token 604 connects to the cryptoasset custodial system 100 over the network 109.

In some embodiments, the hardware security token 604 includes a smart card. The smart card is a physical electronic authorization device used to control access to the cryptoasset custodial system 100. The smart card can be a plastic credit card-sized card with an embedded integrated circuit generating the security key. In some embodiments, the hardware security token 604 includes a USB token. In the USB token, the approver's security key resides in the secure enclave 612 and cannot be passed outside of the token. A digital signature is created on the token while signing the approval. In some embodiments, the hardware security token 604 includes a hardware dongle. The hardware dongle is computer hardware that connects to a port on another device (e.g., the computer device 608) to provide it with secured approval functionality. For example, the approval application on the computer device 608 only functions when the hardware dongle is plugged into the computer device 608. In some embodiments, an approver can have more than one hardware security token 604, each of which is communicably coupled to the computer device 608 or the cryptoasset custodial system 100 using Bluetooth, Wi-Fi, radio frequency communication, the network 109, or a combination thereof. In some embodiments, each hardware security token 604 is associated with an approver with whom the computer device 608 is associated.

Once the server computer 102 transmits the approval request to the computer device 608 associated with the specific approver, the server computer 102 receives the security key from the hardware security token 604 associated with the specific approver. In some embodiments, the computer device 608 receives the approval request and automatically transmits a request for the security key to the hardware security token 604. In other embodiments, the computer device 608 receives the approval request and prompts the specific approver to operate the hardware security token 604.

In some embodiments, the server computer 102 receives the security key directly from the hardware security token 604. In other embodiments, the computer device 608 receives the security key from the hardware security token 604 and transmits the security key to the server computer 102. The server computer 102 transmits the security key to the risk analysis module 104. The risk analysis module 104 uses the security key to authenticate the identity of the specific approver.

The security key is transmitted to the cryptoasset custodial system 100 for each approval of a cryptoasset transaction. The hardware security token 604 is one of several hardware security tokens. Each hardware security token generates a different security key. More than one hardware security token can be associated with the specific approver, such that more than one security key is needed for authentication of the specific approver. In some embodiments, each hardware security token is associated with a different approver of the cryptoasset custodial system 100. The different approvers include the required specific approver.

In some embodiments, the security key received from the hardware security token 604 is a synchronous dynamic security key. The hardware security token 604 generates a group of synchronous dynamic security keys that are indexed by a first timer in the hardware security token 604. For example, the hardware security token 604 generates a different synchronous dynamic security key at fixed time intervals (e.g., based on a time of day encrypted with a secret key associated with the specific approver). The risk analysis module 104 includes a second timer synchronized to the first timer. The second timer indexes synchronous dynamic security keys generated by the risk analysis module 104 for validating an approver.

In some embodiments, the security key received from the hardware security token 604 is an asynchronous one-time security key. The asynchronous one-time security key is generated by the hardware security token 604 using a cryptographic algorithm based on a secret key associated with the specific approver. For example, the cryptographic algorithm can be a symmetric-key algorithm that uses the same secret key for both encryption of plaintext and decryption of ciphertext. The asynchronous one-time security key is valid for only one use and for a limited time. The risk analysis module 104 validates the asynchronous one-time security key using the same cryptographic algorithm based on the secret key associated with the specific approver.

In some embodiments, the risk analysis module 104 generates a cryptographic authentication challenge based on a context of the cryptoasset transaction. The cryptographic authentication challenge is transmitted to the computer device 608 or the hardware security token 604. The security key received from the hardware security token 604 is a response generated by the hardware security token 604 to the cryptographic authentication challenge. For example, the hardware security token 604 receives the challenge from the server computer 102. The hardware security token 604 computes a response by applying a cryptographic hash function to the challenge from the server computer 102 combined with a secret key associated with the specific approver and stored in the secure enclave 612. The hardware security token 604 transmits the response as well as the original challenge back to the server computer 102. Once the server computer 102 receives the response, the risk analysis module 104 applies the same hashing function to the challenge data combined with a copy of the secret key associated with the specific approver. If the resulting value and the response sent by the hardware security token 604 match, the identity of the approver is authenticated.

In some embodiments, the server computer 102 transmits the approval request to the computer device 608 responsive to the hardware security module 105 determining that an endorsement of the cryptoasset transaction has been received from multiple user devices 108 in satisfaction of a quorum for endorsing the cryptoasset transaction. Each user device 108 is associated with a different user of the cryptoasset custodial system 100 and the quorum is specified by the policy stored in the hardware security module 105. The process of completing a quorum of endorsing users is illustrated and described in more detail with reference to FIGS. 1, 3A, 3B, 4, and 5.

Responsive to determining that the security key received from the hardware security token 604 is valid, the hardware security module 105 signs the cryptoasset transaction using a cryptographic key stored in the hardware security module 105. The cryptographic key is a private key of an asymmetric cryptographic key pair associated with the cryptoasset transaction and usable to control access to the cryptoasset. The signing of a cryptoasset transaction with a private key of an asymmetric cryptographic key pair is illustrated and described in more detail with reference to FIGS. 1, 2A, and 2B. The server computer 102 performs the cryptoasset transaction on the cryptoasset using the cryptographic key.

The data storage facility 106 is illustrated and described in more detail with reference to FIG. 1. The data storage facility 106 may include one or more databases, which can be or include relational databases or any other type of mechanism for storing data of the cryptoasset custodial system 100 in an organized way, where the data may be structured data and/or unstructured data.

FIG. 7 illustrates a process 700 for risk mitigation for the cryptoasset custodial system 100. The cryptoasset custodial system 100 is illustrated and described in more detail with reference to FIGS. 1 and 6. In some embodiments, the process 700 of FIG. 7 is performed by the cryptoasset custodial system 100. Other entities, for example, a computer device 608, perform some or all of the steps of the process 700 in other embodiments. The computer device 608 is illustrated and described in more detail with reference to FIG. 6. Likewise, embodiments may include different and/or additional steps, or perform the steps in different orders.

The cryptoasset custodial system 100 uses the server computer 102 to transmit 704 an approval request for a cryptoasset transaction associated with a cryptoasset. The approval request is transmitted in accordance with a policy stored in a hardware security module 105 of the cryptoasset custodial system 100. The hardware security module 105 is communicably coupled to the server computer 102. The policy can specify (1) a minimum number of approvers that must approve the cryptoasset transaction before it can be performed, (2) at least one specific approver whose approval is required, or (3) a maximum time period within which all approvals must be received. The approval request is transmitted to at least a computer device 608 associated with the specific approver. The computer device 608 communicates with the cryptoasset custodial system 100 over the network 109. The approval request causes the computer device 608 to prompt the specific approver to approve the cryptoasset transaction.

The cryptoasset custodial system 100 uses the server computer 102 to receive 708 a security key from a hardware security token 604 associated with the specific approver. The security key indicates an approval of the cryptoasset transaction. The security key is transmitted to the cryptoasset custodial system 100 for each approval of a cryptoasset transaction. The hardware security token 604 can be one of several hardware security tokens. In that case, each hardware security token generates a different security key. More than one hardware security token can be associated with the specific approver, such that more than one security key is needed for authentication of the specific approver. In some embodiments, each hardware security token is associated with a different approver of the cryptoasset custodial system 100. The different approvers include the required specific approver.

The cryptoasset custodial system 100 uses a risk analysis module 104 of the cryptoasset custodial system 100 to authenticate 712 an identity of the specific approver based on the security key. The risk analysis module 104 is communicably coupled to the server computer 102. In some embodiments, the risk analysis module 104 generates a cryptographic authentication challenge based on a context of the cryptoasset transaction. The cryptographic authentication challenge is transmitted to the computer device 608 or the hardware security token 604. The security key received from the hardware security token 604 is a response generated by the hardware security token 604 to the cryptographic authentication challenge. For example, the hardware security token 604 receives the challenge from the server computer 102. The hardware security token 604 computes a response by applying a cryptographic hash function to the challenge from the server computer 102 combined with a secret key associated with the specific approver and stored in the secure enclave 612. The hardware security token 604 transmits the response as well as the original challenge back to the server computer 102. Once the server computer 102 receives the response, the risk analysis module 104 applies the same hashing function to the challenge data combined with a copy of the secret key associated with the specific approver. If the resulting value and the response sent by the hardware security token 604 match, the identity of the approver is authenticated.

Responsive to the authenticating of the identity of the specific approver, the cryptoasset custodial system 100 uses the hardware security module 105 to sign 716 the cryptoasset transaction using a cryptographic key stored in the hardware security module 105. The cryptographic key is a private key of an asymmetric cryptographic key pair associated with the cryptoasset transaction and usable to control access to the cryptoasset.

The cryptoasset custodial system 100 uses the server computer 102 to perform 720 the cryptoasset transaction on the cryptoasset using the cryptographic key. For example, an address of the cryptoasset transaction is stored in a collection with other addresses belonging to the customer in the cryptoasset custodial system 100, known as the customer's "vault." The cryptoasset is represented as a slot inside a vault that can hold an amount of an asset type (e.g., Bitcoin, Ethereum).

FIG. 8 is a high-level block diagram showing an example of a hardware architecture of a processing system 800 that can be used to implement some or all of the cryptoasset custodial system 100 or a user device 108. The cryptoasset custodial system 100 can include one or more instances of an architecture such as shown in FIG. 8, where multiple such instances can be coupled to each other via one or more private networks.

The illustrated processing system 800 includes one or more processors, including a CPU 810, one or more memories 811 (at least a portion of which may be used as working memory, e.g., random access memory (RAM)), one or more data communication device(s) 812, one or more input/output (I/O) devices 813, and one or more mass storage devices 814, all coupled to each other through an interconnect 815. The interconnect 815 may be or include one or more conductive traces, buses, point-to-point connections, controllers, adapters and/or other conventional connection devices. Each processor 810 controls part of the operation of the processing device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 811 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 814 can be or include one or more hard drives, digital versatile disks (DVDs), flash memories, or the like. Each memory 811 and/or mass storage 814 can store (individually or collectively) data and instructions that configure the processor(s) 810 to execute operations to implement the techniques described above. Each communication device 812 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 800, each I/O device 813 can be or include a device such as a display (which may include a transparent AR display surface), audio speaker, keyboard, mouse or other pointing device, microphone, camera, etc. Note, however, that such I/O devices may be unnecessary if the processing device 800 is embodied solely as a server computer.

In the case of a user device, a communication device 812 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 812 can be or include, for example, any of the aforementioned types of communication devices, a wired Ethernet adapter, cable modem, DSL modem, or the like, or a combination of such devices.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
    receiving, by a hardware security module of a cryptoasset custodial system, from a server computer of the cryptoasset custodial system, a requested operation description including data describing a cryptoasset transaction and an organization that owns a cryptoasset;
    determining, by the hardware security module, at least one reviewing entity required for approval of the cryptoasset transaction based at least in part on a policy map for the organization;
    responsive to receiving an indication of the determination from the hardware security module, transmitting, by the server computer of the cryptoasset custodial system and to a computing device of the at least one reviewing entity, an approval request for the cryptoasset transaction;
    receiving, by the server computer of the cryptoasset custodial system and from the computing device of the at least one reviewing entity of the cryptoasset custodial system, a signed approval signed by a security key from a hardware security token of the at least one reviewing entity, based on the at least one reviewing entity approving the cryptoasset transaction;
    transmitting, by the server computer of the cryptoasset custodial system and to a risk analysis module of the cryptoasset custodial system, the signed approval;
    authenticating, by the risk analysis module of the cryptoasset custodial system, the at least one reviewing entity based on the signed approval received from the computing device of the at least one reviewing entity in response to the approval request;
    responsive to receiving an indication of the authentication of the at least one reviewing entity from the risk analysis module, signing, by the hardware security module, the cryptoasset transaction using a cryptographic key stored in the hardware security module; and
    performing, by the server computer, the cryptoasset transaction of the cryptoasset signed by the hardware security module using the cryptographic key.

2. The method of claim 1, wherein subsequent to determining, by the hardware security module, the at least one reviewing entity required for approval, further comprising:
    determining, by the hardware security module, that an endorsement of the cryptoasset transaction has been received from a plurality of endorser user devices corresponding to a plurality of endorsers in satisfaction of a quorum specified by the policy map, the plurality of endorsers different from the at least one reviewing entity, and
    wherein transmitting, by the server computer of the cryptoasset custodial system and to the computing device of the at least one reviewing entity, the approval request for the cryptoasset transaction further comprises transmitting the approval request in response to the determination that the endorsement has been received from the plurality of endorser user devices.

3. The method of claim 1, wherein the cryptographic key is a private key of an asymmetric cryptographic key pair associated with the cryptoasset transaction.

4. The method of claim 1, wherein the approval request is configured to cause the computing device of the at least one reviewing entity to prompt the at least one reviewing entity to approve the cryptoasset transaction.

5. The method of claim 1, wherein the hardware security token is one of a plurality of hardware security tokens, each hardware security token of the plurality of hardware security tokens generating a different security key, and
    wherein each hardware security token is associated with a different reviewing entity of a plurality of reviewing entities of the cryptoasset custodial system, the plurality of reviewing entities including the at least one reviewing entity.

6. The method of claim 1, wherein the hardware security token is a synchronous dynamic security key generated by the hardware security token and indexed by a timer of the hardware security token.

7. The method of claim 1, wherein the hardware security token is an asynchronous one-time security key generated by the hardware security token using a cryptographic algorithm.

8. The method of claim 1, wherein the hardware security token comprises at least one of a smart card, a universal serial bus token, or a hardware dongle.

9. The method of claim 1, further comprising:
wherein subsequent to authenticating the at least one reviewing entity, obtaining, by the hardware security module, a notification that the risk analysis module has authenticated the at least one reviewing entity.

10. A cryptoasset custodial system comprising:
a hardware security module, a server computer, and a risk analysis module, wherein each of the hardware security module, the server computer, and the risk analysis module comprises one or more computer processors; and
a non-transitory computer-readable storage medium storing instructions executable by the one or more computer processors, the instructions when executed by the one or more computer processors cause the one or more computer processors to perform operations comprising:
receiving, by the hardware security module of the cryptoasset custodial system, from the server computer of the cryptoasset custodial system, a requested operation description including data describing a cryptoasset transaction and an organization that owns a cryptoasset;
determining, by the hardware security module, at least one reviewing entity required for approval of the cryptoasset transaction based at least in part on a policy map for the organization;
responsive to receiving an indication of the determination from the hardware security module, transmitting, by the server computer of the cryptoasset custodial system and to a computing device of the at least one reviewing entity, an approval request for the cryptoasset transaction;
receiving, by the server computer of the cryptoasset custodial system and from the computing device of the at least one reviewing entity of the cryptoasset custodial system, a signed approval signed by a security key from a hardware security token of the at least one reviewing entity, based on the at least one reviewing entity approving the cryptoasset transaction;
transmitting, by the server computer of the cryptoasset custodial system and to the risk analysis module of the cryptoasset custodial system, the signed approval;
authenticating, by the risk analysis module of the cryptoasset custodial system, the at least one reviewing entity based the signed approval received from the computing device of the at least one reviewing entity in response to the approval request;
responsive to the authentication of the at least one reviewing entity, signing, by the hardware security module, the cryptoasset transaction using a cryptographic key stored in the hardware security module; and
performing, by the server computer, the cryptoasset transaction of the cryptoasset signed by the hardware security module using the cryptographic key.

11. The cryptoasset custodial system of claim 10, wherein subsequent to determining, by the hardware security module, the at least one reviewing entity required for approval, the instructions further cause the one or more computer processors to perform further operations comprising:
determining, by the hardware security module, that an endorsement of the cryptoasset transaction has been received from a plurality of endorser user devices corresponding to a plurality of endorsers in satisfaction of a quorum specified by the policy map, the plurality of endorsers different from the at least one reviewing entity, and
wherein transmitting, by the server computer of the cryptoasset custodial system and to the computing device of the at least one reviewing entity, the approval request for the cryptoasset transaction further comprises transmitting the approval request in response to the determination that the endorsement has been received from the plurality of endorser user devices.

12. The cryptoasset custodial system of claim 10, wherein the cryptographic key is a private key of an asymmetric cryptographic key pair associated with the cryptoasset transaction.

13. The cryptoasset custodial system of claim 10, wherein the approval request is configured to cause the computing device of the at least one reviewing entity to prompt the at least one reviewing entity to approve the cryptoasset transaction.

14. The cryptoasset custodial system of claim 10, wherein the hardware security token is one of a plurality of hardware security tokens, each hardware security token of the plurality of hardware security tokens generating a different security key, and
wherein each hardware security token is associated with a different reviewing entity of a plurality of reviewing entities of the cryptoasset custodial system, the plurality of reviewing entities including the at least one reviewing entity.

15. The cryptoasset custodial system of claim 10, wherein the security key from the hardware security token is a synchronous dynamic security key generated by the hardware security token and indexed by a timer of the hardware security token.

16. The cryptoasset custodial system of claim 10, wherein the security key from the hardware security token is an asynchronous one-time security key generated by the hardware security token using a cryptographic algorithm.

17. The cryptoasset custodial system of claim 10, wherein subsequent to authenticating, by the risk analysis module of the cryptoasset custodial system, the at least one reviewing entity, the instructions further cause the one or more processors to perform further operations comprising:
obtaining, by the hardware security module, a notification that the risk analysis module has authenticated the at least one reviewing entity.

18. A non-transitory computer-readable storage medium storing instructions executable by one or more computer processors of a cryptoasset custodial system, the instructions when executed by the one or more computer processors cause the one or more computer processors to perform operations comprising:
receiving, by a hardware security module of the cryptoasset custodial system, from a server computer of the cryptoasset custodial system, a requested operation description including data describing a cryptoasset transaction and an organization that owns a cryptoasset;
determining, by the hardware security module, at least one reviewing entity required for approval of the cryptoasset transaction based at least in part on a policy map for the organization;
responsive to receiving an indication of the determination from the hardware security module, transmitting, by the server computer of the cryptoasset custodial system and to a computing device of the at least one reviewing entity, an approval request for the cryptoasset transaction;

receiving, by the server computer of the cryptoasset custodial system and from the computing device of the at least one reviewing entity of the cryptoasset custodial system, a signed approval signed by a security key from a hardware security token of the at least one reviewing entity, based on the at least one reviewing entity approving the cryptoasset transaction;

transmitting, by the server computer of the cryptoasset custodial system and to a risk analysis module of the cryptoasset custodial system, the signed approval;

authenticating, by the risk analysis module of the cryptoasset custodial system, the at least one reviewing entity based on the signed approval received from the computing device of the at least one reviewing entity in response to the approval request;

responsive to receiving an indication of the authentication of the at least one reviewing entity from the risk analysis module, signing, by the hardware security module, the cryptoasset transaction using a cryptographic key stored in the hardware security module; and performing, by the server computer, the cryptoasset transaction of the cryptoasset signed by the hardware security module using the cryptographic key.

* * * * *

UNITED STATES PATENT AND TRADEMARK OFFICE
CERTIFICATE OF CORRECTION

| | | |
|---|---|---|
| PATENT NO. | : 11,842,341 B2 | Page 1 of 1 |
| APPLICATION NO. | : 17/687023 | |
| DATED | : December 12, 2023 | |
| INVENTOR(S) | : Nathan P. McCauley et al. | |

It is certified that error appears in the above-identified patent and that said Letters Patent is hereby corrected as shown below:

In the Claims

In Column 22, Lines 57 and 58, in Claim 6, delete "hardware security token" and insert --security key--

In Column 22, Lines 61 and 62, in Claim 7, delete "hardware security token" and insert --security key--

Signed and Sealed this
Sixth Day of February, 2024

Katherine Kelly Vidal
*Director of the United States Patent and Trademark Office*